United States Patent
Pendharkar et al.

(10) Patent No.: US 8,775,751 B1
(45) Date of Patent: Jul. 8, 2014

(54) AGGRESSIVE RECLAMATION OF TIER-1 STORAGE SPACE IN PRESENCE OF COPY-ON-WRITE-SNAPSHOTS

(75) Inventors: Niranjan Pendharkar, Maharashtra (IN); Shailesh Vaman Marathe, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 302 days.

(21) Appl. No.: 12/962,049

(22) Filed: Dec. 7, 2010

(51) Int. Cl.
*G06F 12/16* (2006.01)
(52) U.S. Cl.
USPC ............ 711/159; 707/649; 707/657; 711/162
(58) Field of Classification Search
None
See application file for complete search history.

(56) References Cited

U.S. PATENT DOCUMENTS

| | | | |
|---|---|---|---|
| 7,587,431 B1 * | 9/2009 | Rao et al. | 1/1 |
| 7,987,156 B1 * | 7/2011 | Chatterjee et al. | 707/638 |
| 8,135,677 B2 * | 3/2012 | Matsuzawa et al. | 707/649 |
| 8,250,035 B1 * | 8/2012 | Tang et al. | 707/639 |

* cited by examiner

*Primary Examiner* — Gary Portka
(74) *Attorney, Agent, or Firm* — Campbell Stephenson LLP (57) ABSTRACT

Reclamation of storage space in presence of copy-on-write snapshot. In one embodiment, a reclamation command is generated. In response to generating the reclamation command, first data held within one storage device is copied to another storage device via a communication link. One or more first physical memory regions of the one storage device, which stores the first data, is allocated to a first region of a data volume. The other storage device is configured to store a copy-on-write snapshot of the data volume. In response to copying the first data, de-allocate the one or more first physical memory regions from the first data volume region.

25 Claims, 5 Drawing Sheets

AGGRESSIVE RECLAMATION OF TIER-1 STORAGE SPACE IN PRESENCE OF COPY-ON-WRITE-SNAPSHOTS

BACKGROUND

File systems are often stored on data volumes created by storage devices (e.g., disk arrays). Data volumes are viewed as a sequence of logical memory blocks that store file system data. Typically, all data volume blocks are equal in size, although this disclosure should not be limited to blocks of equal size. While it is said that a volume stores data, in reality, the data is actually stored directly or indirectly in physical memory blocks of a storage device (e.g., a disk array) that are allocated to the volume blocks.

Snapshot copies of data volumes are created to guard against data corruption. A snapshot is a copy of the data volume as it existed at a point-in-time. In the event of data corruption as a result of user, software, or hardware error, a snapshot copy can be used to restore the corrupted data volume back to a consistent data state that existed at the time the snapshot copy was created.

SUMMARY OF THE INVENTION

In one embodiment of a method, a reclamation command is generated. In response to generating the reclamation command, first data held within one storage device is copied to another storage device via a communication link. One or more first physical memory regions of the one storage device, which stores the first data, is allocated to a first region of a data volume. The other storage device is configured to store a copy-on-write snapshot of the data volume. In response to copying the first data, de-allocate the one or more first physical memory regions from the first data volume region.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Shared storage environments such as storage area networks (SANS) often employ multiple types of storage devices. Tier-1 storage devices (e.g., disk arrays) generally provide data storage that is faster, more reliable, but more expensive than tier-2 storage devices (e.g., JBODs). For the purposes of explanation only, tier-1 storage devices are presumed to be disk arrays while tier-2 storage devices are presumed to be JBODs, it being understood the terms tier-1 storage and tier-2 storage should not be limited thereto. Data volumes are usually created on faster, more expansive disk arrays, while snapshot copies are usually created on less expensive JBODs.

As noted, tier-1 storage (e.g., disk array) is generally more expensive than tier-2 storage (e.g., JBOD). Thin provisioning in a shared storage environment is a method for optimizing use of tier-1 storage. Thin provisioning relies on on-demand allocation of blocks of physical memory to blocks of a data volume versus the traditionally method of allocating all physical memory blocks for a volume up front. Thin provisioning helps avoid poor utilization rates, often as low as 10%, that occur in the traditional storage allocation method where large pools of physical storage are allocated to data volumes but remained unused (not written to). This traditional model is often called fat or thick provisioning. With thin provisioning, storage use efficiency can be driven higher with very little administrative overhead. Businesses can purchase less storage upfront, defer storage capacity upgrades in line with actual business use, and save operating costs (electricity and floorspace) associated with unused storage.

Reclamation is another process for efficiently using tier-1 storage. Reclamation is a process of deallocating or freeing physical storage blocks that are associated with, for example, file data that is identified as deleted or no longer used or needed. Once the physical storage blocks are deallocated from respective volume bocks, they can be reallocated as needed via thin provisioning. Thin reclamation keeps data volumes thin over time by allowing granular, automated, nondestructive physical storage reclamation within tier-1 storage.

Figure 1:
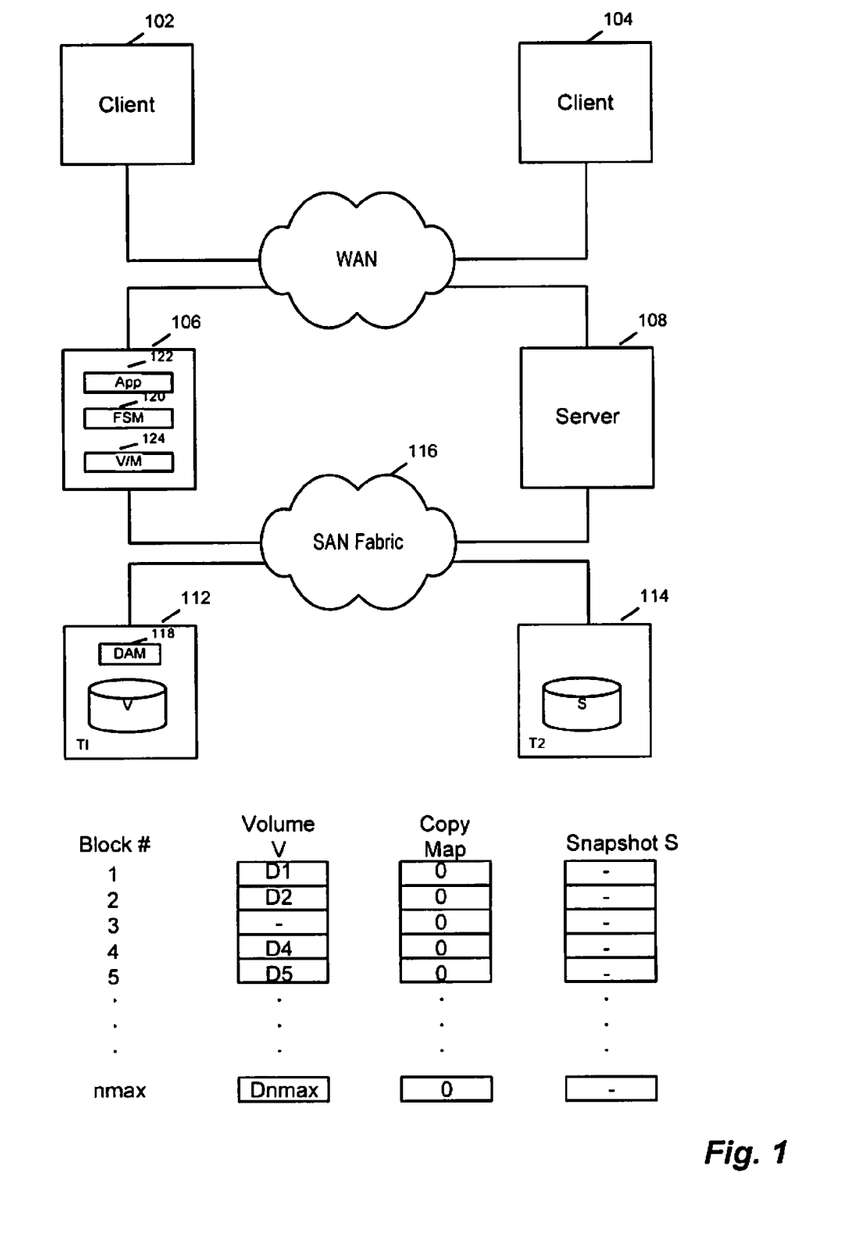
FIG. 1 graphically illustrates relevant components of an example system that employs thin provisioning and reclamation.

FIG. 1 illustrates in block diagram form relevant components of a system 100 that employs thin provisioning and reclamation. System 100 includes a pair of client computer systems 102 and 104 in data communication with server computer systems 106 and 108 via a wide area network (WAN) such as the Internet. System 100 includes a SAN, which includes a SAN fabric 116 coupled to storage devices including disk array 112 and JBOD 114. In one embodiment, SAN fabric 116 may take form in components such as switches, routers, bridges, etc. that facilitate communication between storage devices 112 and 114 and servers 106 and 108. Server 106 includes a file system manager 120 in data communication between an application 122 and a volume manager 124. In one embodiment, modules 120-124 may take form in instructions executing on one or more processors of server 106.

Disk array 112 creates a volume V, which consists of a sequence of equally sized blocks configured to store file system data D(x) as graphically shown in FIG. 1. In alternative embodiments, the blocks of data volume may unequal in size. Moreover, it should be understood as noted above that while it is said that blocks of volume V store data, in reality the data is stored directly or indirectly in physical memory blocks allocated by a disk array manager 118 of disk array 112. In this regard, disk array manager 118 may create and have access to an allocation table that maps blocks of data volume V to respective blocks of physical memory within disk array 112. Moreover, disk array manager 118 employs thin provisioning when allocating physical memory blocks to blocks of data volume V. Because of thin provisioning, volume manager 124 may view more storage capacity in volume V than has been physically allocated within disk array 112. This allows flexibility in the growth of data volume V, without having to predict accurately how much data volume V will grow. Instead physical memory block growth becomes sequential as needed. Disk array manager 118 allocates physical memory blocks only when volume manager 124 initially writes data to a block, not when the data volume is initially created. Disk array manager 118 also implements reclamation of physical memory blocks that have been previously allocated to volume V.

Volume manager 124 can create one or more snapshot copies of volume V. A snapshot copy, as its names implies, is a copy of a data volume at a particular point-in-time. Each snapshot copy can be used to restore the data volume to the state it occupied at the time the snapshot was created. This is valuable in the event of corruption of data volume V.

FIG. 1 shows a graphical representation of snapshot S, which is created on JBOD 114. Like volume V, snapshot S is logical in nature. Snapshot S includes nmax data blocks corresponding to the nmax data blocks of volume V. Initially, each data block of snapshot S is empty. Volume manager 124 may create a copy map for each snapshot. FIG. 1 graphically illustrates an example copy map created for snapshot S. This copy map includes nmax entries corresponding to the nmax data blocks, respectively, of volume V, and the nmax data blocks, respectively, of snapshot S. Initially, each bit $c(x)$ of the copy map is set to logical 0. The copy map is used to track data that has been copied from volume V to snapshot S as will be more fully described below.

Volume manager 124 maintains snapshot S using a copy-on-write (COW) process. This process is initiated when volume manager 124 generates a transaction to write data to block x of data volume V. Before this write transaction is implemented, volume manager 124 accesses copy map to read the value of $c(x)$ stored therein. If $c(x)$ is set to 1, the write transaction is implemented without further hesitation. However, if $c(x)$ is set to 0, the write transaction is implemented only after data of block x is copied from volume V to the corresponding block x of snapshot S. Use of the COW process, however, limits the effectiveness of the reclamation process running on disk array manager 118 as will be more fully described below.

Volume V stores a file system that is accessible by file system manager 120. Consider a situation in which volume V is 80% full with file system data. In other words, 80% of the data blocks of volume V store needed data of the file system. Again, while it is said that data blocks of a volume store data, the data is actually stored in physical memory blocks of disk array 112, which are allocated by the disk array manager 118 via thin provisioning. File system manager 120, in response to instructions from application 122, may subsequently delete a number of files of the file system. In one embodiment, each file may have metadata that identifies whether the file is currently being used. When the file system manager 120 deletes a file, the corresponding metadata is set to indicate that the file is effectively deleted even though the unneeded data contents of the file are still stored within one or more physical memory blocks of disk array 112. As far as the file system manager 120 is concerned, however, the file is effectively deleted and its data erased.

Suppose over time through file deletion and/or file defragmentation, the quantity of needed file data stored within volume is reduced by 30%. Normally, the reclamation process running on disk array manager 118 would reclaim the physical memory blocks within array 112 that are allocated to the 30% of the volume blocks that are now unused or unneeded. However, a physical memory block should not be reclaimed by disk array manager 118 if the physical memory block stores effectively deleted or unneeded data that has yet to be copied from volume V to snapshot S. In other words, the presence of snapshot S may preclude reclamation of some physical memory blocks of memory since blocks of snapshot S may point to these physical memory blocks via respective blocks of volume V. In other words, the presence of snapshot S may prevent reclamation of expensive disk array 112 memory blocks particularly if one or more blocks of snapshot S are empty. What is needed is an apparatus and method for reclamation of physical memory blocks in the presence of a COW snapshot or other any image (e.g., asynchronous mirror or a replication secondary) or data object that is dependent on data that is subject to reclamation.

Figure 2:
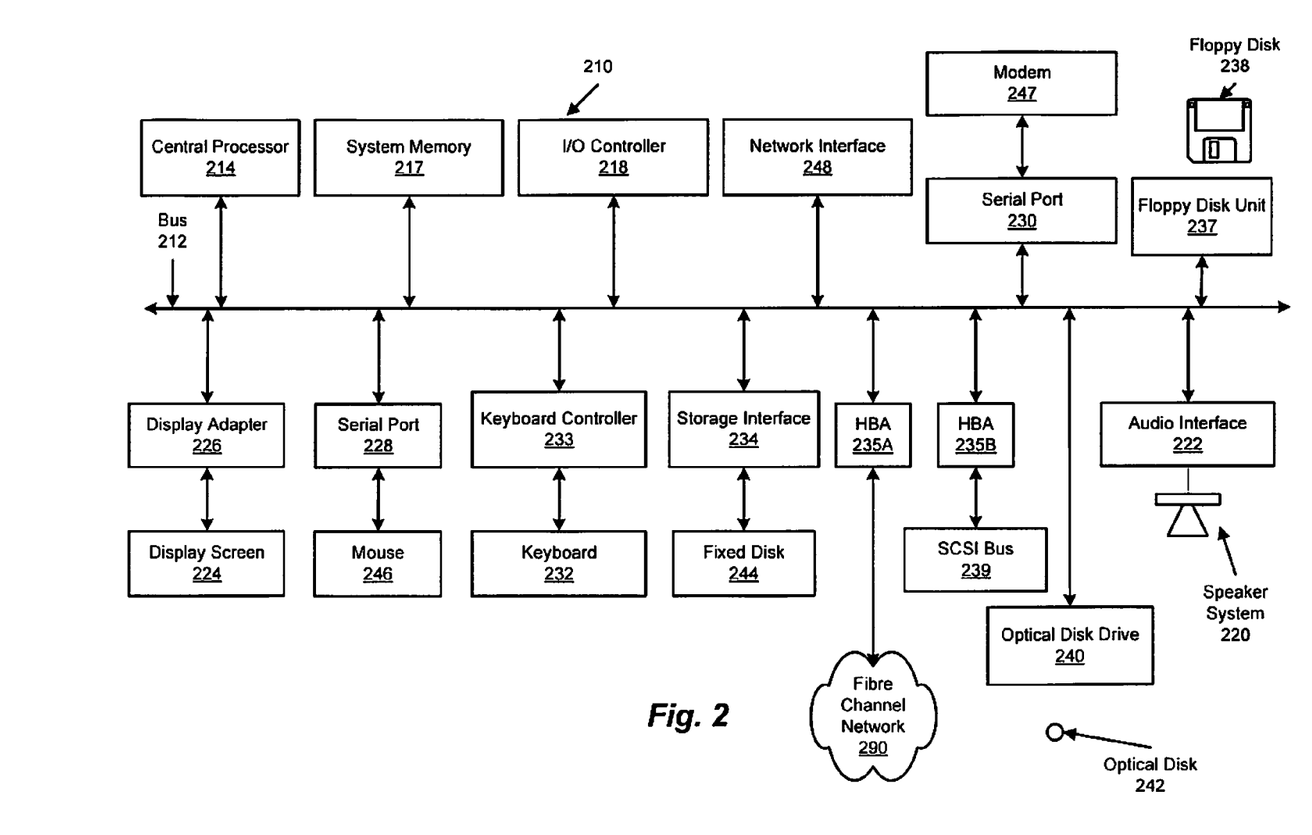
FIG. 2 is a block diagram of an example computer system that may be employed in the system of FIG. 1.

FIG. 2 depicts a block diagram of an computer system 210 suitable for implementing an apparatus and method for reclamation of physical memory blocks in the presence of a COW snapshot or other image or data object that is dependent on data reclamation. Computer system 210 may be illustrative of various computer systems (e.g., a server) shown in FIG. 1. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

The operation of a computer system such as that shown in FIG. 2 is readily known in the art and is not discussed in detail in this application. Code for implementing the present disclosure can be stored in computer-readable storage media such as one or more of system memory 217, fixed disk 244, optical disk 242, or floppy disk 238. Memory 220 is also used for storing temporary variables or other intermediate information during the execution of instructions by the processor 210. The operating system provided on computer system 210 may be MS-DOS®, MS-WINDOWS®, OS/2®, UNIX®, Linux®, or another known operating system.

Figure 3:
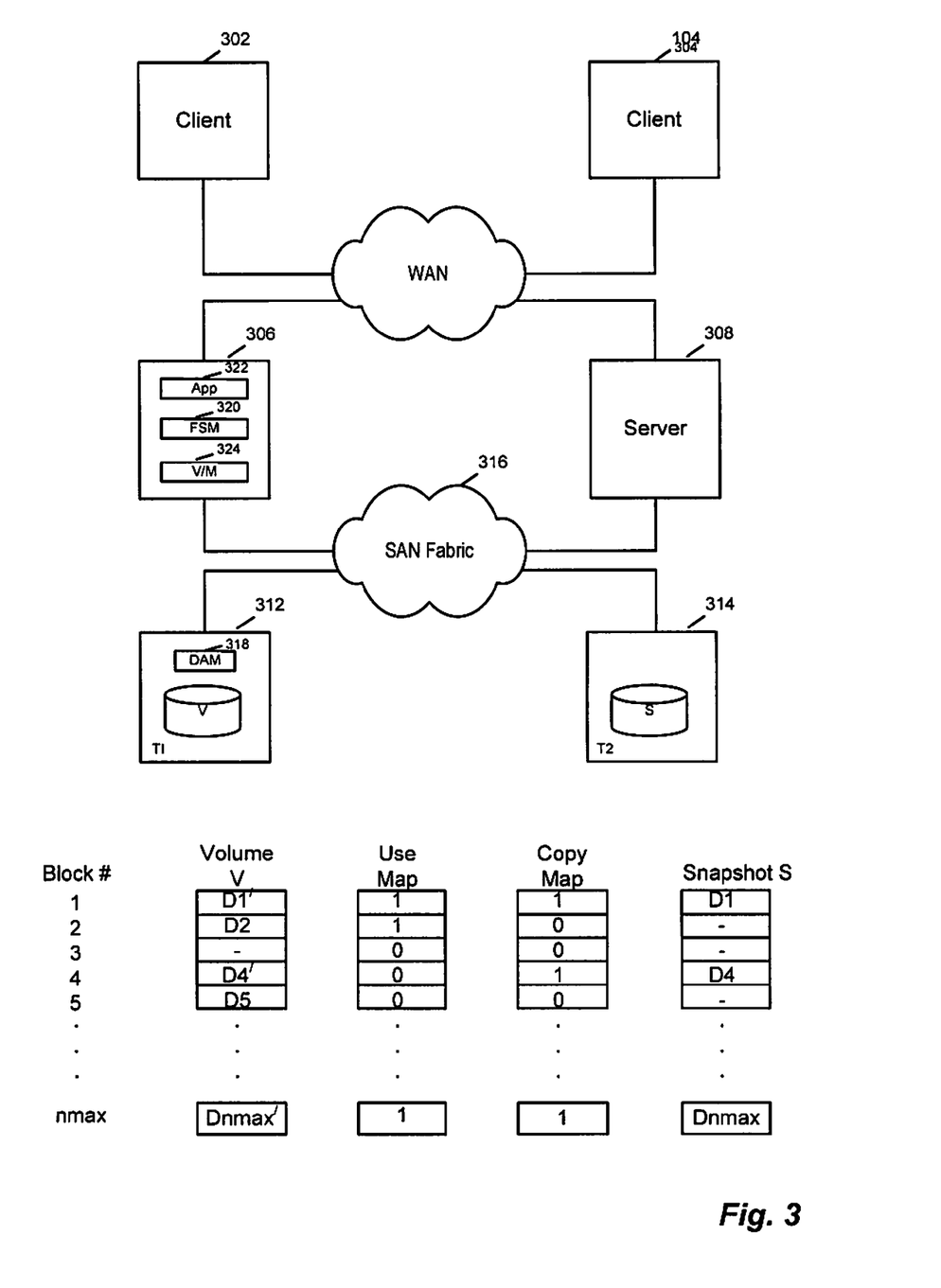
FIG. 3 graphically illustrates relevant components of an example system that employs thin provisioning and reclamation.

As noted, the presence of snapshot S or other data dependent image (e.g., asynchronous mirror or a replication secondary) or object may prevent the reclamation of expensive storage. FIG. 3 illustrates an example system 300 in which physical memory blocks can be reclaimed in the presence of a COW snapshot. The remaining disclosure will describe reclamation in the presence of a COW snapshot it being understood that the disclosure may apply to reclamation of other types of data dependent images or data objects.

System 300 employs thin provisioning and reclamation. System 300 includes a pair of client computer systems 302 and 304 in data communication with server computer systems 306 and 308 via a wide area network (WAN) such as the Internet. System 300 includes a SAN, which includes a SAN fabric 316 coupled to storage devices including expensive (e.g., tier 1) disk array 312 and relatively inexpensive (e.g., tier 2) JBOD 314. In one embodiment, SAN fabric 316 may take form in components such as switches, routers, bridges, etc. that facilitate communication between storage devices 312 and 314 and servers 306 and 308. Server 306 includes a file system manager 320 in data communication between an application 322 and a volume manager 324. In one embodiment, modules 320-324 may take form in instructions executing on one or more processors of server 306.

Disk array 312 creates a volume V, which consists of a sequence of equally sized blocks configured to store file system data $D(x)$ as graphically shown in FIG. 3. In alternative embodiments, the blocks of data volume may unequal in size. Moreover, it should be understood as noted above that while it is said that blocks of volume V store data, in reality the data is stored directly or indirectly in physical memory blocks allocated by a disk array manager 318 of disk array 312. In this regard, disk array manager 318 may create and have access to an allocation table that maps blocks of data volume V to respective blocks of physical memory within disk array 312. Moreover, disk array manager 318 employs thin provisioning when allocating physical memory blocks to blocks of data volume V. Because of thin provisioning, volume manager 324 may view more storage capacity in volume V than has been physically allocated within disk array 312. This allows flexibility in the growth of data volume V, without having to predict accurately how much data volume V will grow. Instead physical memory block growth becomes sequential as needed. Disk array manager 318 allocates physical memory blocks only when volume manager 324 initially writes data to a block, not when the data volume is initially created. Disk array manager 318 also implements reclamation of physical memory blocks that have been previously allocated to volume V.

Volume manager 324 can create one or more shapshot copies of volume V. FIG. 3 shows a graphical representation of snapshot S, which is created on JBOD 314. Like volume V, snapshot S is logical in nature. Snapshot S includes nmax data blocks corresponding to the nmax data blocks of volume V. Initially, each data block of snapshot S is empty. Volume manager 324 may create a copy map for each snapshot. FIG. 3 graphically illustrates an example copy map created for snapshot S. This copy map includes nmax entries corresponding to the nmax data blocks, respectively, of volume V, and the nmax data blocks, respectively, of snapshot S. Initially, each bit $c(x)$ of the copy map is set to logical 0.

Volume manager 324 maintains snapshot S using a copy-on-write (COW) process. This process is initiated when volume manager 324 generates a transaction to write data to block x of data volume V. Before this write transaction is implemented, volume manager 324 accesses copy map to read the value of $c(x)$ stored therein. If $c(x)$ is set to 1, the write transaction is implemented without further hesitation. However, if $c(x)$ is set to 0, the write transaction is implemented only after data of block x is copied from volume V to the corresponding block x of snapshot S.

Figure 4:
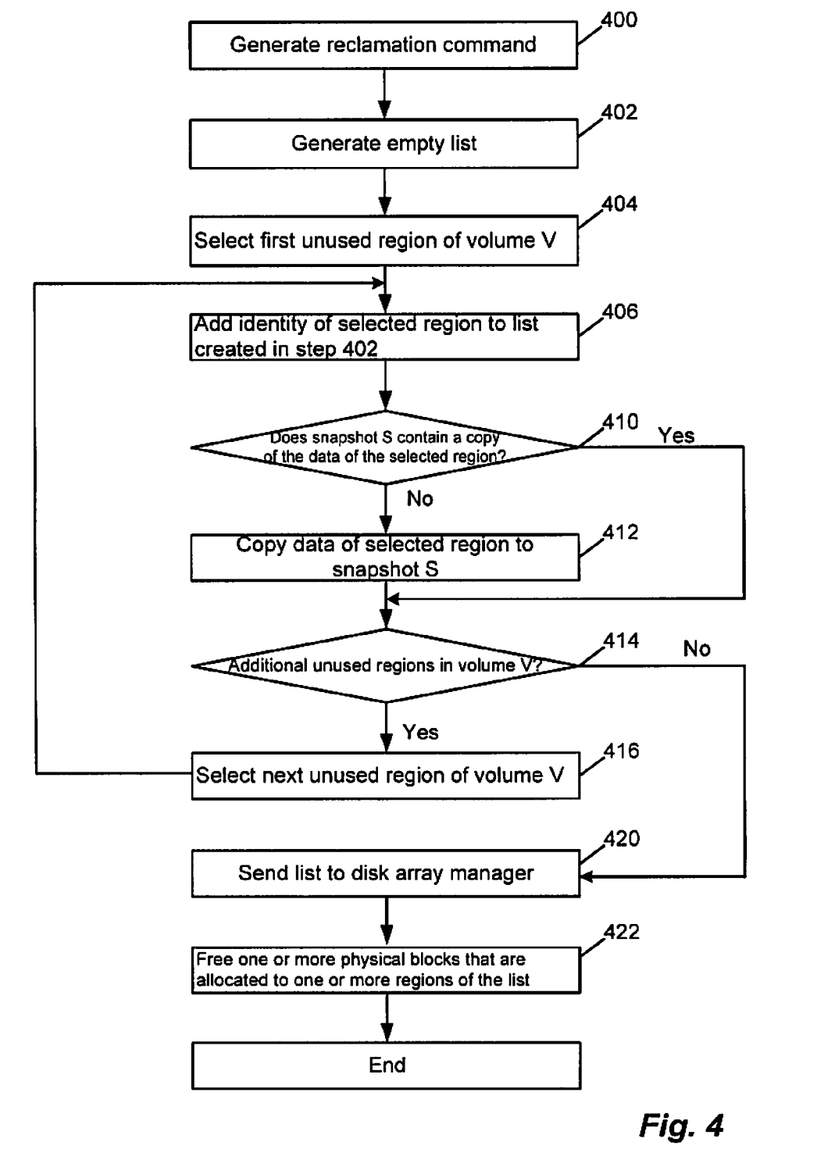
FIG. 4 is a flow chart that illustrates relevant aspects of a process used in the system of FIG. 3.

With continuing reference to FIG. 3, FIG. 4 illustrates relevant aspects of an example method for reclaiming physical memory blocks within disk array 312 notwithstanding the presence of COW snapshot S. The process in FIG. 4 begins with step 400 in which a reclamation command is generated. In the illustrated example, the reclamation command is generated by volume manager 324 it being understood that another device such as file system manager 320 or disk array manager 318 may generate the reclamation command. In step 402, an empty list is created in memory. In one embodiment, this list may be created in local memory by volume manager 324. This list will eventually contain the identification of volume regions that are considered unneeded or unused (e.g., contain data that is considered effectively deleted). A volume region may contain a single volume block or sequence of consecutive volume blocks.

After creation of the list, a first unused or unneeded (hereinafter unused) region of the volume V is selected. Before the region is selected, it must be identified. There are several methods that could be employed to identify volume regions that are unused. In one embodiment, volume manager may maintain a bit map with entries corresponding to respective volume blocks. If a volume block is considered unused, the corresponding bit is set to logical 0, and if the volume block is considered used, the corresponding bit is set to logical 1. In another embodiment, file system manager 320 can access file metadata that indicates, for example, whether the corresponding files have been effectively deleted. When an effectively deleted file is identified, file system manager 320 can identify the volume region(s) that contain the data of the deleted file. File manager 320 may then convey the identified volume region(s) by block number or block numbers to volume manager 324, which in turn updates the list of unused volume blocks.

The identity of the selected region of the unused volume block or blocks is added to the list that was created in step 402. Thereafter, volume manager 324 determines whether snapshot S contains a copy of all data of the selected volume region. If one or more data blocks within snapshot S corresponding to the selected region lacks a copy of data from the corresponding block or blocks of volume V, then volume manager 324 copies data from the identified region to snapshot S as shown in step 412. This copy process includes copying data from memory blocks in disk array 312, which are mapped to the data block(s) of the selected volume region, to memory blocks in JBOD 314, which are mapped to the corresponding data block(s) of snapshot S. Thereafter, a determination is made as to whether volume V contains additional unused regions. If so, the next unused region of volume V is selected in step 416 and step 406 is repeated. Eventually, when the list created in step 402 contains the identity of all unused regions of volume V, volume manager, or some other component, may send the list of unused volume blocks to the disk array manager 318 within disk array 312.

In response to disk array manager 318 receiving the list of unused volume blocks, disk array manager 318 can reclaim all physical memory blocks that were allocated to the regions identified in the list as shown in step 422. In one embodiment, disk array manager 318 may track memory blocks allocation using one or more look-up tables (LUT) that map volume blocks, identified by block number, to memory blocks in disk array 312, identified by physical memory address. In this embodiment, disk array manager 318 can reclaim physical memory blocks by examining the one or more LUTs and nullifying any volume block therein if it is also contained in the list of unused volume blocks from volume manager 324. In one embodiment, each entry in the LUTs may contain an allocation bit that can be toggled from one state (e.g., logical 1) to another state (logical 0) when the physical memory block, which can be identified by physical memory address in the entry, is deallocated from a volume block, which is identified by volume block number in the entry, that is identified in the list of unused volume blocks. Other methods of reclaiming physical memory blocks are contemplated. Ultimately, reclaimed physical memory blocks can be reallocated by disk array manager 318 to blocks in volume V or in another data object on an as needed basis using thin provisioning.

The process of FIG. 4 is a general description of one embodiment of a method for reclaiming physical storage blocks contained within disk array 112. This process employs a step determining the regions of volume V that are unused by, for example, file system manager 320 as a result of, for example, file deletion or file defragmentation. As noted above, volume manager 324 may contain a use map that it can use to determine which data blocks are currently unused. FIG. 3 illustrates a graphical example of the use map. This use map includes nmax entries corresponding to the nmax data blocks of volume V. Each entry includes a bit set to logical 1 or logical 0. If set to logical 1, the data in the corresponding data block is considered to be used. If set to logical 0, the data in the corresponding volume block is considered to be unused or essentially deleted. The use map can be updated by volume manager 324 in response to commands issued by file system manager 120. For example, file system manager 320 may generate an instruction to delete a file, the data of which is stored in several blocks of volume V. In response, volume manager 324 may access the use map and set to 0 those entries corresponding to the blocks that store data effectively deleted by file system manager 320.

Figure 5:
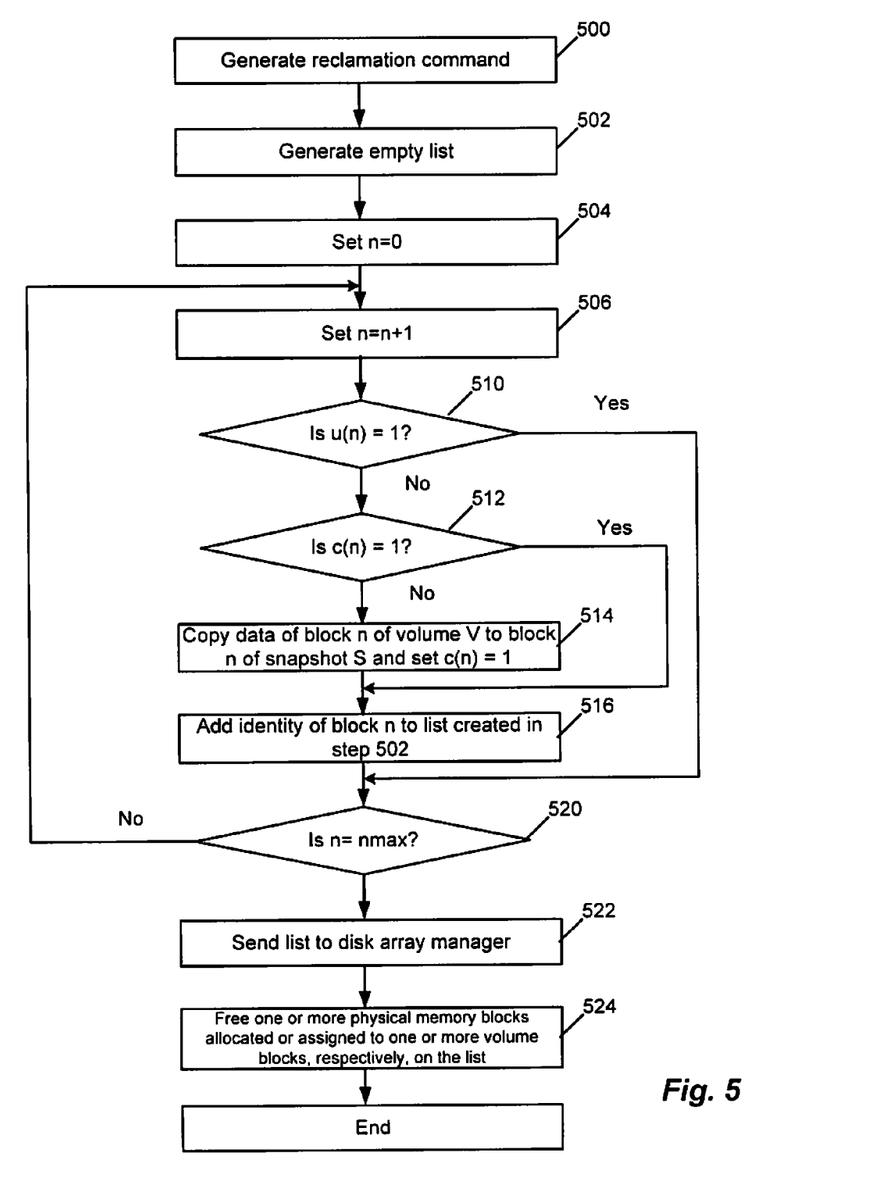
FIG. 5 is a flow chart that illustrates relevant aspects of a process used in the system of FIG. 3

FIG. 5 illustrates one embodiment of a reclamation process that employs the use map. FIG. 5 initiates when a reclamation command is generated, for example, by file system manager 320. In step 502, volume manager 324 creates a list, which is initially empty. Eventually, this list will identify data blocks that are deemed unused within volume V. In step 504, volume manager 324 sets a dummy variable n to 0. In step 506, the dummy variable is incremented by 1. In step 510, entry u(n) within the use map is accessed to determine its state. If set to 0, block n of volume V is considered unused and its identity should be added to the list that was created in step 502. In step 512, volume manager 324 accesses copy map to determine the state of c(n). If set to 0, the data contents of unused block n of volume V should be copied to block n of snapshot S in step 514 and c(n) set to 1. After data of block n is copied to block n of snapshot S in step 514 or after a determination that u(n) is set to 0 in step, or after a determination that u(n) is set to 1 in step 512, volume manager 324 compares the value of n to nmax, which is the total number of data blocks within volume V. If n is less than nmax, steps 506 is repeated. Otherwise, the list that contains the identity of unused volume blocks is sent to the disk array manager 318 along with, in some embodiments, an instruction to reclaim physical blocks in array 112 that are allocated. Disk array manager 318 in turn frees or deallocates physical memory blocks that have been allocated to one, some or all of the memory blocks identified in the list.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

We claim:

1. A method comprising:
   generating a memory reclamation command;
   in response to generating the memory reclamation command,
      accessing a first map, wherein
         the first map indicates physical memory regions that are designated as unused, and
      determining, based on the first map, whether first data is designated as unused;
   in response to a determination that the first data is designated as unused, determining whether the first data is copied to another storage device, wherein
      one or more first physical memory regions of one storage device, which stores the first data, is allocated to a first region of a data volume, and
      the other storage device is configured to store an image that is data dependent on the data volume;
   in response to a determination that the first data is not yet copied to the other storage device, copying the first data held within the one storage device to the other storage device via a communication link;
   in response to copying the first data, de-allocating the one or more first physical memory regions from the first data volume region; and
   overwriting data of the one or more first physical memory regions with new data after the one or more first physical memory regions are de-allocated.

2. The method of claim 1 further comprising an act of adding an identity of the first data volume region to a list and sending the list to the one storage device before de-allocating the one or more first physical memory regions from the first data volume region.

3. The method of claim 2 further comprising:
   in response to generating the memory reclamation command, copying second data stored within the one storage device to the other storage device via the communication link, wherein
      one or more second physical memory regions of the one storage device, which stores the second data, is allocated to a second region of the data volume;
   in response to copying the second data, de-allocating the one or more second physical memory regions from the second data volume region;
   adding an identity of the second data volume region to the list before the list is sent to the one storage device.

4. The method of claim 1 further comprising an act of reallocating the one or more first physical memory regions to a region of the first data volume or a region of a second data volume.

5. The method of claim 1 wherein the storage device comprises a disk array, and wherein the other storage device comprises just a bunch of disks (JBOD).

6. The method of claim 5 wherein the disk array and JBOD are coupled via the communication link, and wherein the communication link is contained in a storage area network (SAN).

7. The method of claim 1 further comprising:
accessing metadata of a file to determine if the file has been effectively deleted from a file system;
wherein the copying is performed in response to determining the file has been effectively deleted;
wherein the de-allocating is performed in response to determining the file has been effectively deleted;
wherein the first region of the data volume stores data of the file.

8. A computer readable medium comprising instructions, which when executed, implements a method comprising:
in response to generation of a memory reclamation command,
accessing a first map, wherein
the first map indicates physical memory regions that are designated as unused, and
determining, based on the first map, whether first data is designated as unused;
in response to a determination that the first data is designated as unused,
determining whether the first data is copied to another storage device, wherein
one or more first physical memory regions of one storage device, which stores the first data, is allocated to a first region of a data volume, and
the other storage device is configured to store a copy-on-write (COW) snapshot of the data volume;
in response to a determination that the first data is not yet copied to the other storage device, copying the first data held within the one storage device to the other storage device via a communication link; and
in response to copying the first data, generating an instruction for de-allocating the one or more first physical memory regions from the first data volume region.

9. The computer readable medium of claim 8, wherein the method further comprises an act of adding an identity of the first data volume region to a list and subsequently sending the list to the one storage device along with the instruction to de-allocate the one or more first physical memory regions from the first data volume region.

10. The computer readable medium of claim 9, wherein the method further comprises:
in response to generation of the reclamation command, copying second data stored within the one storage device to the other storage device via the communication link, wherein one or more second physical memory regions of the one storage device, which stores the second data, is allocated to a second region of the data volume;
adding an identity of the second data volume region to the list before the list is sent to the one storage device.

11. The computer readable medium of claim 8, wherein the method further comprises an act of reallocating the one or more first physical memory regions to a region of the first data volume or a region of a second data volume.

12. The computer readable medium of claim 8, wherein the storage device comprises a tier-1 storage device, and wherein the other storage device comprises a tier-2 storage device.

13. The computer readable medium of claim 8, wherein the tier-1 storage device and the tier-2 storage device are coupled via the communication link, and wherein the communication link is contained in a storage area network (SAN).

14. The computer readable medium of claim 8, wherein the method further comprises:
accessing metadata of a file to determine if the file has been effectively deleted from a file system;
wherein the copying is performed in response to determining the file has been effectively deleted;
wherein generating of the instruction to de-allocate is performed in response to determining the file has been effectively deleted;
wherein the first region of the data volume stores data of the file.

15. A method of transmitting instructions to a computer system, wherein the instructions, which when executed, implements a process comprising:
in response to generation of a reclamation command,
accessing a first map, wherein
the first map indicates physical memory regions that are designated as unused, and
determining, based on the first map, whether first data is designated as unused;
in response to a determination that the first data is designated as unused,
determining whether the first data is copied to another storage device, wherein
one or more first physical memory regions of a storage device, which stores the first data, is allocated to a first region of a data volume, and
the other storage device is configured to store a copy-on-write (COW) snapshot of the data volume;
in response to a determination that the first data is not yet copied to the other storage device, copying the first data held within the one storage device to the other storage device via a communication link; and
in response to copying the first data, generating an instruction for de-allocating the one or more first physical memory regions from the first data volume region.

16. The method of claim 15, wherein the process further comprises an act of adding an identity of the first data volume region to a list and subsequently sending the list to the one storage device along with the instruction to de-allocate the one or more first physical memory regions from the first data volume region.

17. The method of claim 16, wherein the process further comprises:
in response to generation of the reclamation command, copying second data stored within the one storage device to the other storage device via the communication link, wherein one or more second physical memory regions of the one storage device,
which stores the second data, is allocated to a second region of the data volume;
adding an identity of the second data volume region to the list before the list is sent to the one storage device.

18. The method of claim 15, wherein the process further comprises an act of reallocating the one or more first physical memory regions to a region of the first data volume or a region of a second data volume.

19. The method of claim 15, wherein the process further comprises:
accessing metadata of a file to determine if the file has been effectively deleted from a file system;
wherein the copying is performed in response to determining the file has been effectively deleted;
wherein generating of the instruction to de-allocate is performed in response to determining the file has been effectively deleted;
wherein the first region of the data volume stores data of the file.

20. A method comprising:
creating a copy-on-write (COW) snapshot of a data volume;
after creation of the COW snapshot, designating a data block of the data volume as unused;
identifying data blocks of the data volume that have been designated as unused, and
not copied to the COW snapshot, wherein
the identifying comprises
accessing a first map, wherein
the first map indicates physical memory regions that are designated as unused, and
determining, based on the first map, whether one or more data blocks are designated as unused,
in response to a determination that the one or more data blocks are designated as unused, identifying data blocks of the one or more data blocks that are not copied to the COW snapshot; and
copying the identified data blocks from the data volume to the COW snapshot.

21. The method of claim 1, wherein
the first region comprises second data, and
the second data is copied to the other storage device prior to the generating the memory reclamation command.

22. The method of claim 1, wherein
the image is a copy-on-write (COW) snapshot of at least the first region of the data volume, and
the image is generated prior to the generating the memory reclamation command.

23. The method of claim 1, wherein
at least two consecutive entries in the first map indicate non-consecutive physical memory regions.

24. The method of claim 1, wherein
the determining whether the first data is copied to another storage device comprises accessing a second map,
the second map indicates physical memory regions that have been copied to the other storage device, and
and the determining whether the first data is copied to the other storage device is based on the second map.

25. A method comprising:
accessing metadata of a file to determine if the file has been effectively deleted from a file system;
generating a memory reclamation command;
in response to generating the memory reclamation command, determining whether first data is copied to another storage device, wherein
one or more first physical memory regions of one storage device, which stores the first data, is allocated to a first region of a data volume,
the first region of the data volume stores data of the file, and
the other storage device is configured to store an image that is data dependent on the data volume;
in response to a determination that the first data is not yet copied to the other storage device, copying the first data held within the one storage device to the other storage device via a communication link, wherein
the copying is performed in response to a determination that the file has been effectively deleted;
in response to copying the first data, de-allocating the one or more first physical memory regions from the first data volume region, wherein
the de-allocating is performed in response to determining the file has been effectively deleted; and
overwriting data of the one or more first physical memory regions with new data after the one or more first physical memory regions are de-allocated.

\* \* \* \* \*